(12) United States Patent
Chien et al.

(10) Patent No.: US 8,142,743 B2
(45) Date of Patent: Mar. 27, 2012

(54) METHOD AND APPARATUS FOR FORMING ZINC OXIDE

(75) Inventors: Hung-Min Chien, Hsinchu (TW); Yu-Du Hsu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 154 days.

(21) Appl. No.: 12/636,006

(22) Filed: Dec. 11, 2009

(65) Prior Publication Data

US 2010/0329973 A1 Dec. 30, 2010

(30) Foreign Application Priority Data

Jun. 25, 2009 (TW) ................................ 98121310 A

(51) Int. Cl.
*C01G 9/00* (2006.01)
(52) U.S. Cl. ....................................... 423/107; 423/623
(58) Field of Classification Search .................. 423/622, 423/107, 623
See application file for complete search history.

(56) References Cited

U.S. PATENT DOCUMENTS

| | | | |
|---|---|---|---|
| 3,928,550 A * | 12/1975 | Seitzer | 423/657 |
| 4,098,875 A | 7/1978 | Ishii et al. | |
| 4,496,370 A * | 1/1985 | Billings | 48/197 R |
| 6,663,681 B2 | 12/2003 | Kindig et al. | |
| 6,685,754 B2 | 2/2004 | Kindig et al. | |
| 2003/0129305 A1 | 7/2003 | Wu et al. | |
| 2007/0172415 A1 * | 7/2007 | Zimmermann et al. | 423/622 |
| 2008/0190781 A1 | 8/2008 | Huang | |

FOREIGN PATENT DOCUMENTS

| | | |
|---|---|---|
| CN | 1349951 A | 5/2002 |
| CN | 1355138 A | 6/2002 |
| CN | 1384057 A | 12/2002 |
| CN | 1410354 A | 4/2003 |
| CN | 1418818 A | 5/2003 |
| CN | 1458305 A | 11/2003 |
| CN | 1462720 A | 12/2003 |
| WO | WO-03/048047 A1 | 6/2003 |
| WO | WO-2004/000491 A2 | 12/2003 |
| WO | WO-2006/114034 A1 | 11/2006 |

* cited by examiner

*Primary Examiner* — Steven Bos
(74) *Attorney, Agent, or Firm* — Birch, Stewart, Kolasch & Birch, LLP

(57) ABSTRACT

Provided is a method for forming zinc oxide which includes introducing a zinc vapor and a water vapor to a reactor; providing a zinc particulate to the reactor to promote the reaction between the zinc vapor and water vapor, thereby forming zinc oxide and hydrogen. An apparatus for forming zinc oxide is also provided.

17 Claims, 5 Drawing Sheets

METHOD AND APPARATUS FOR FORMING ZINC OXIDE

This Application claims priority of Taiwan Patent Application No. 098121310, filed on Jun. 25, 2009, the entirety of which is incorporated by reference herein.

BACKGROUND OF THE INVENTION

1. Field of the Invention

The present invention relates to a method and an apparatus for forming zinc oxide. More particularly, the present invention relates to a cost-effective and environmentally friendly method and apparatus for forming zinc oxide.

2. Description of the Related Art

Zinc oxide is an important raw material used in many industries. Zinc oxide is a II-IV group ceramic material which has characters such as high chemical stability, a low dielectric constant, a high electromechanical coupling coefficient, photocatalytic property, and a large band gap. At present, micro-sized zinc oxide is widely used as an adhesion enhancing additive for tires. World demand for the micro-sized zinc oxides is more than six hundred thousand tons. Sub-micro-sized zinc oxide is primarily used for high performance aircraft tires. Meanwhile, it is known that nano-sized zinc oxides having properties such as surface effect, quantum size effect, uniform dispersion and high photocatalytic property, are completely different from micro-sized or sub-micro-sized zinc oxides having a particle size of more than 100 nm. In recent years, there have been breakthroughs in the application of the nano-sized zinc oxides in fields such as ceramics, chemical engineering, optics, electricity and medical, in which industrial value and growth prospects are greater than conventional micro-sized zinc oxides.

The conventional process of forming zinc oxide can be represented by a chemical equation: $Zn+\frac{1}{2}O_2 \rightarrow ZnO$. The process is performed at a temperature of about 1000° C. by using heavy oils as fuels. This process is an open process which consumes huge amounts of energy and produces a lot of carbon dioxide. Often used methods for forming nano-sized zinc oxide include precipitation, homogeneous precipitation; spray pyrolysis and sol-gels processes. These methods all have their specific advantages, respectively, but all of them have the same problems of high cost and complex manufacturing. Therefore, a cost-effective and environmentally friendly method for forming zinc oxide is needed.

New environmentally friendly sources have been promoted due to global warming and high oil prices. Hydrogen energy is considered as one of a next generation of energy sources and its application in hydrogen fuel cells has been widely used to replace petroleum. Accordingly, hydrogen energy is expected to become the most popular energy source in future.

Thus, the commercial prospects for the formation of zinc oxides (or nano-sized zinc oxides) along with hydrogen energy sources are high. For example, U.S. Pat. No. 6,663,681 discloses a method for reducing a water vapor to hydrogen by metal catalysis. In this method, water vapor is introduced through a dipping pipe to contact with a mixture of molten reactive metals (iron and tin are the major constituents), and the reactive metals react with the oxygen atom of the water vapor to form metal oxide and hydrogen. However, because a dipping pipe is used to introduce the water vapor to the molten reactive metals, reaction area is limited. In addition, zinc oxide is not the major product of this reaction and nano-sized zinc oxides are not formed.

WO Patent Publication 2,006/114,034 discloses an electrolysis method for forming zinc oxide and hydrogen. In this method, zinc is used as an electrode for performing water electrolysis process. However, this method needs to consume huge amounts of electrical energy. Moreover, there is no effective method to separate the zinc oxide deposition from the electrolysis system and nano-sized zinc oxides are also not formed.

Therefore, a cost-effective and environmentally friendly method for forming zinc oxide along with hydrogen energy source is needed.

BRIEF SUMMARY OF THE INVENTION

One object of the present invention is to provide a method for forming zinc oxide, comprising: introducing zinc vapor and water vapor to a reactor; and providing a zinc-based particulate to enter into the reactor to promote reaction of the zinc vapor and the water vapor for forming zinc oxide and hydrogen, wherein the reactor temperature is between about 600° C. and about 910° C.

Still another object of the present invention is to provide an apparatus for forming zinc oxide, comprising: a zinc vapor generator; a water vapor generator; a particulate generator to providing a zinc-based particulate; and a reactor for receiving zinc vapor from the zinc vapor generator, water vapor from the water vapor generator and the zinc-based particulate from the particulate generator, to promote reaction of the zinc vapor and the water vapor for forming zinc oxide and hydrogen.

BRIEF DESCRIPTION OF THE DRAWINGS

The invention will now be described, by way of example, with reference to the accompanying drawings, in which.

DETAILED DESCRIPTION OF THE INVENTION

The present invention provides a novel method and an apparatus for forming zinc oxide. Zinc vapor or a zinc precursor is used to form a zinc-based particulate, wherein the zinc-based particulate may be present in a form of a solid particle or a liquid droplet. The zinc-based particulate may promote the zinc vapor and the water vapor to form zinc oxide and hydrogen simultaneously. The reaction is a hydrolysis reaction. The chemical formula of the hydrolysis reaction can be represented as:

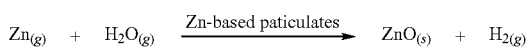

$$Zn_{(g)} + H_2O_{(g)} \xrightarrow{\text{Zn-based paticulates}} ZnO_{(s)} + H_{2(g)}$$

Furthermore, the zinc oxide particle thus formed may be recycled as the zinc-based particulate, which may also promote the zinc vapor and the water vapor to carry out the hydrolysis reaction.

Figure 1:
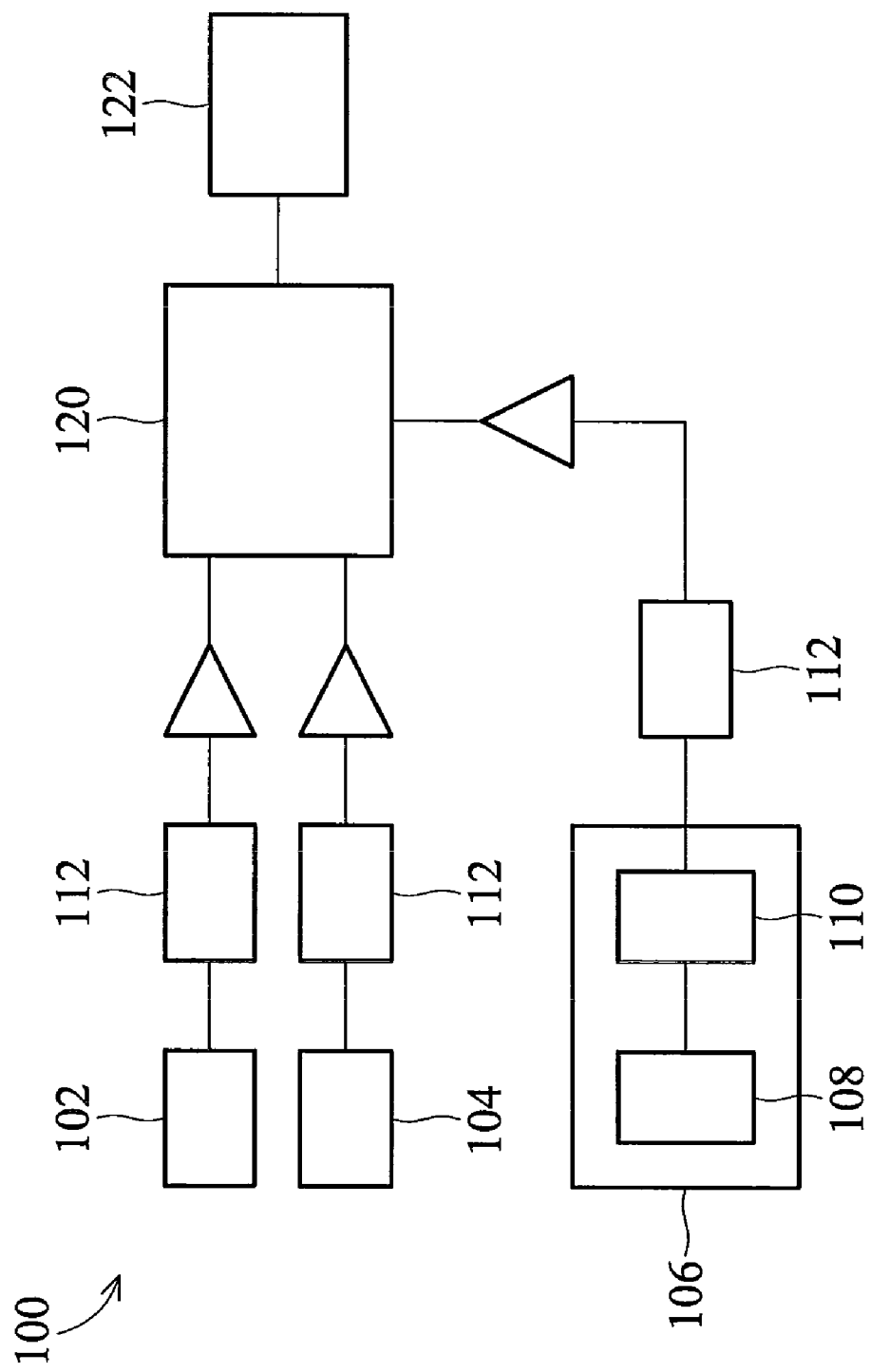
FIG. 1 illustrates an apparatus for forming zinc oxide according to the present invention.

Refer to FIG. 1, the present invention also provides an apparatus 100 to carry out the hydrolysis reaction to form zinc oxide. A zinc vapor generator 102 is used to provide the zinc vapor. In one embodiment, the zinc vapor has a temperature between about 400° C. and about 1000° C., preferably between about 600° C. and about 910° C., most preferably between 800° C. and about 910° C. A water vapor generator 104 is used to provide the water vapor to reacting with the zinc vapor. A particulate generator 106 having a furnace 108 and a diluter 110 is used to provide the zinc particulate. A saturated vapor may be formed in the furnace 108 by heating and vaporizing zinc or the zinc precursor represented by ZnM, wherein M may be, for example, oxygen, hydroxyl, alkoxyl or combinations thereof. The saturated vapor has a temperature between about 400° C. and about 1000° C. A cold dilute gas is provided from the diluter for participate in an aerosol process with the zinc vapor. During the aerosol process, the zinc particulate is formed by utilizing a vaporizing-condensing mechanism. Specifically, the saturated vapor is mixed with the cold dilute gas to form an oversaturated vapor, and then the zinc particulate would be formed due to condensing of the oversaturated vapor. Alternatively, the zinc precursor may be introduced to the reactor directly, and then the zinc particulate is formed by pyrolysis or hydrolysis. In one embodiment, the zinc particulate is not particularly limited to be zinc, zinc oxide, zinc hydroxide or combinations thereof. The zinc particulate has a diameter of about 3 nm to about 1 μm. The cold dilute gas may be, for example, nitrogen, argon, any inert gases non-reactive to zinc or zinc oxide, or combinations thereof. The cold dilute gas has a temperature between about 10° C. and about 400° C. In addition, the cold dilute gas can not only participate in the aerosol process to form the zinc particulate, but also can dilute the concentration of the zinc particulate to reduce the collisions of the zinc particulate. Thus, preventing and/or reducing coagulations of the zinc particulate.

The zinc vapor, water vapor and zinc particulate are carried by a carrier gas to the reactor 120 to carry out the hydrolysis reaction. The flow rate can be controlled by a controller 112. In one embodiment, the flow rate ratio of the zinc vapor and the water vapor is between about 1:1 and about 1:100. In one preferable embodiment, the flow rate ratio is between about 1:10 and about 1:30. The molar ratio of the zinc vapor and the zinc particulate is between about 10,000:1 and about 1,000,000,000:1. The carrier gas may be, for example, nitrogen, argon, any inert gases non-reactive to zinc or zinc oxide, or combinations thereof.

In one embodiment, a temperature of the reactor 120 may be controlled at about 600° C. to about 710° C., preferably about 750° C. to about 800° C., to provide enough energy to carry out the hydrolysis reaction. At first, the zinc particulate may be allowed to react with the water vapor to form a crystal nucleus which can reduce activation energy of the hydrolysis reaction. In the present embodiment, the crystal nucleus can serve as a reaction site of the hydrolysis reaction Zinc oxide is formed and deposited on the surface of the crystal nucleus. Furthermore, one crystal nucleus may be induced to form more crystal nuclei such that the efficiency of the hydrolysis reaction may be effectively improved. In the conventional process, the reaction is carried out without the zinc particulate. The reaction site is often located on the wall of the reactor, and the zinc oxide is deposited on the wall such that it is difficult for the water vapor to penetrate the deposited zinc oxide layer at the reaction sites. Furthermore, it is difficult for carrier gas to take the zinc oxide layer deposited on the wall away, such that the effective yield of zinc oxide is deceased. In contrast to the conventional process, the present invention provides uniformly distributed zinc particulates (present in a form of a solid particle or a liquid droplet) served as more reaction sites in the reactor, such that effective field of zinc oxide is increased. Also, it is easier for carrier gas to take the zinc oxide deposited on the surface of the zinc particulates away.

The zinc oxide deposition is carried to a collector 122 by a carrier gas, wherein the carrier gas is the similar with the carrier gas carrying water vapor, zinc vapor and zinc particulate described above. The present method also provides forming micro-sized, sub-micro-sized or nano-sized zinc oxide by controlling the different reaction conditions. In one embodiment, the formed zinc oxide has a particle size between about 3 nm and about 10 μm, and preferably between about 40 nm and about 60 nm (when temperature of the reactor is about 800° C.). Additionally, hydrogen and zinc oxide are formed simultaneously. It is known that a molar ratio of the formed zinc oxide and hydrogen in the hydrolysis reaction is 1:1, which is calculated by the chemical equation described above. Thus, in the present invention, the yield of the zinc oxide is determined by the concentration of hydrogen since the variation of the concentration of hydrogen is easier to be measured by gas chromatography. Furthermore, the formed zinc oxide can be recycled as a zinc particulate to promote another hydrolysis reaction. Another product of the invention, hydrogen, may be used for other applications of hydrogen energy such that the consummation of the energy of reaction can be recycled. Thus, the present invention provides an environmentally friendlier cost-effective method for forming zinc oxide.

EXAMPLE 1

Figure 2:
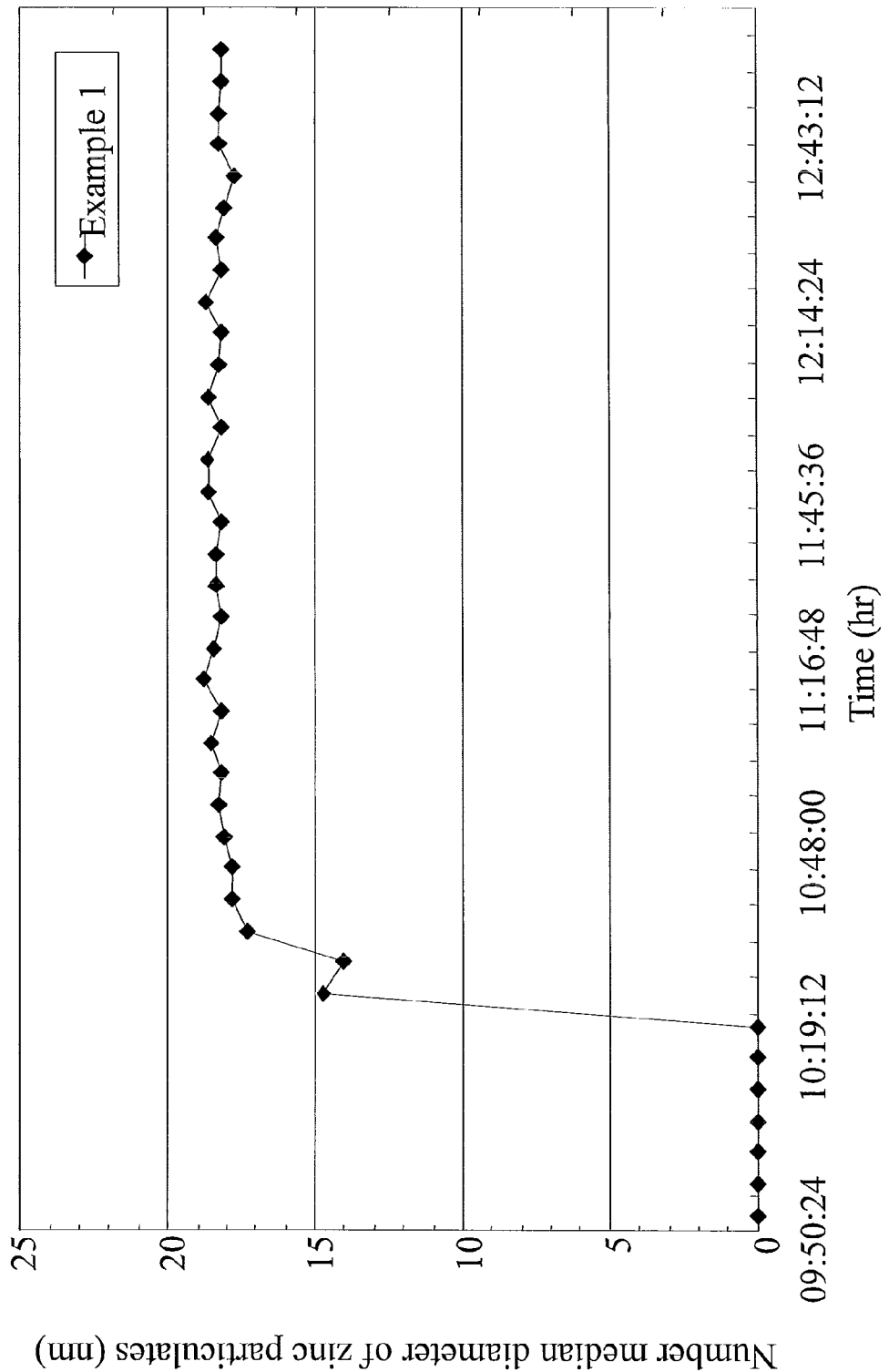
FIG. 2 illustrates number median diameter of zinc particulate versus time according to the present invention.
Figure 3B:
FIGS. 3a and 3b are transmission electron microscope images of zinc oxides according to the present invention.
Figure 3A:
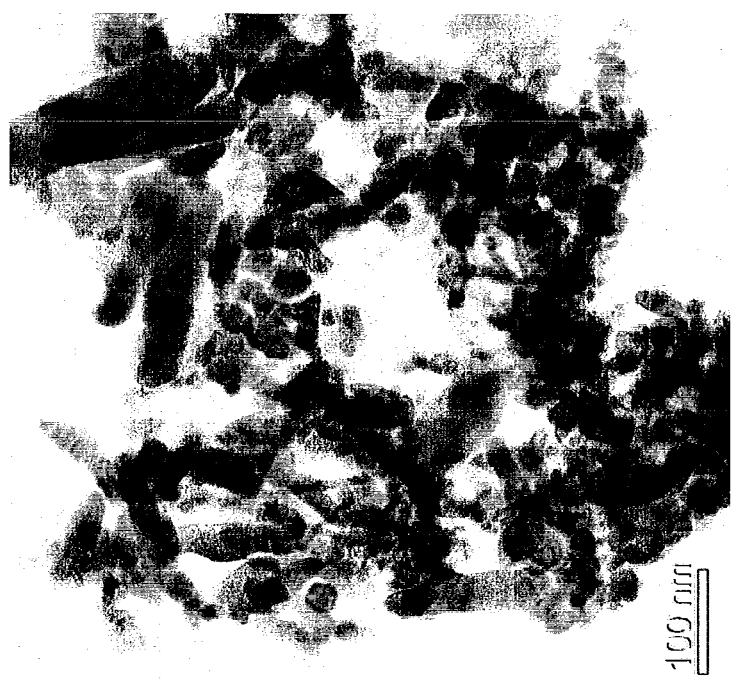

A zinc vapor having a vapor pressure of 0.22 atm and a temperature of 774° C. was carried to a reactor by nitrogen having a flow rate of 2 slpm. At the same time, a water vapor having a flow rate of 2.5 slpm and a temperature of 100-200° C. was also introduced to the reactor. Zinc was vaporized to a saturated vapor in a furnace having a temperature of 600° C. The saturated zinc vapor was then mixed with nitrogen which had a temperature of 25° C. and a flow rate of 0.5 slpm, and the zinc particulate was formed by condensing. The particle size of zinc oxide was measured by scanning mobility particle sizer (SMPS). Referring to FIG. 2, the zinc particulate had a particle size of about 18 nm. Next, the zinc vapor and the zinc particulate were carried to the reactor, wherein the flow rate of the zinc particulate was 1.5 alpm. The temperature of the reactor was kept at 853° C. to carry out the hydrolysis reaction. After reaction, the concentration of hydrogen obtained was 1.54%. The obtained zinc oxide particles were analyzed by a transmission electron microscope, as shown as FIGS. 3a and 3b.

EXAMPLES 2-3

The same procedure as in Example 1 was repeated for Examples 2-3, except that the pressures of the zinc vapor were adjusted to 0.68 atm and 1.0 atm, respectively, and the obtained concentrations of hydrogen were 1.82% and 2.0%.

The results of Examples 1-3 are summarized in table 1. According to the description of Table 1, the concentrations of hydrogen were nearly in direct proportion with the pressures of the zinc vapor when the zinc vapor pressures were larger than 0.22 atm.

TABLE 1 relation to zinc vapor pressure and concentration of hydrogen

|  | zinc vapor pressure (atm) | concentration of hydrogen (%) |
|---|---|---|
| Example 1 | 0.22 | 1.54 |
| Example 2 | 0.68 | 1.82 |
| Example 3 | 1.0 | 2.0 |

COMPARATIVE EXAMPLES 1A-3A

The same procedure as in Examples 1-3 were repeated for Comparative Examples 1A-3A, except that the zinc particulate was not added. The obtained concentrations of hydrogen were 0.07%, 0.38% and 1.66%.

COMPARATIVE EXAMPLES 1B-3B

The same procedure as in Examples 1-3 were repeated for Comparative Examples 1B-3B, except that the zinc vapor was not added. There was no hydrogen formed.

Figure 4:
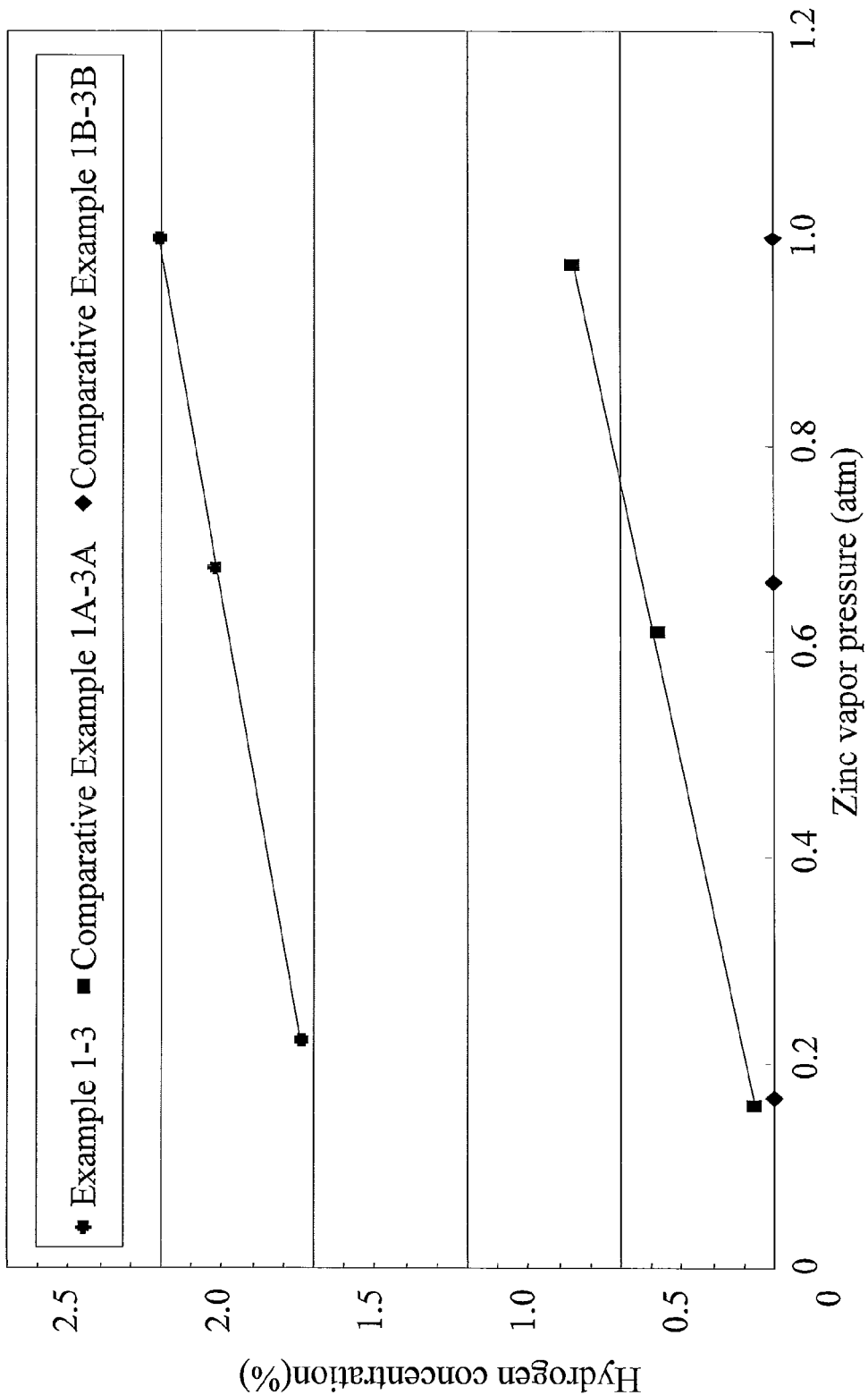
FIG. 4 illustrates zinc vapor pressure versus hydrogen concentration according to the present invention.

The comparisons between Examples 1-3 and Comparative Examples 1A-3A were shown in FIG. 4, which shows that the concentrations of hydrogen were increased effectively when the zinc particulate was added. Furthermore, the concentrations of hydrogen were in direct proportion with the pressures of zinc vapor which proved that the zinc particulate can reduce activation energy of the hydrolysis reaction and provide more reaction sites, thereby promoting to carry out the hydrolysis reaction. In addition, no hydrogen was formed before adding the zinc vapor (Comparative Examples 1B-3B). Meanwhile, no zinc oxide was formed.

EXAMPLES 4-8

The same procedure as in Example 3 was repeated for Examples 4-8, except that the reactor had temperatures of 700° C., 775° C., 850° C., 925° C. and 950° C., respectively. The obtained concentrations of hydrogen were 2.4%, 3.0%, 2.3%, 1.5% and 1.4%.

COMPARATIVE EXAMPLES 4-8

The same procedure as in Examples 4-8 were repeated for Comparative Examples 4-8, except that the reactor had temperatures of 700° C., 775° C., 850° C., 925° C. and 950° C., respectively. The obtained concentrations of hydrogen were 2.4%, 3.0%, 2.3%, 1.5% and 1.4%.

Figure 5:
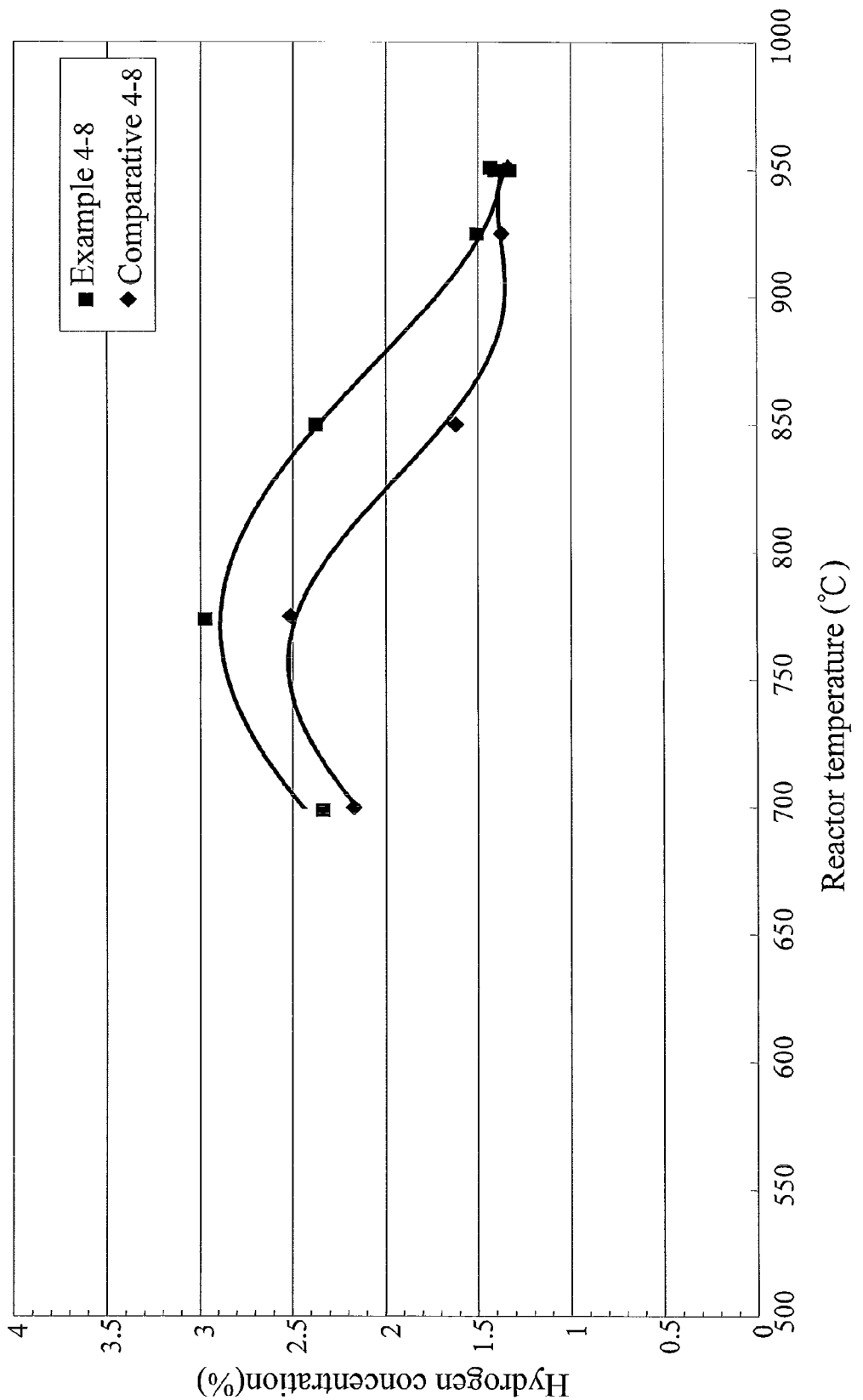
FIG. 5 illustrates reactor temperatures versus hydrogen concentrations according to the present invention.

The comparisons between Examples 4-8 and Comparative Examples 4-8 shown in FIG. 5, show the relation between the temperatures of the reactor and the concentrations of hydrogen. It is observed that there were no distinct differences in the concentrations of hydrogen when the reactor had a temperature higher than 910° C., for the added and not added zinc particulates examples. This phenomenon may be explained by vaporization of the zinc particulate to the zinc vapor when the temperature in the reactor was higher the boiling point of zinc (907° C.). Therefore, insufficient nuclei can be provided, that does not help raising the concentration of hydrogen. It was also proved that the zinc particulate is an essential substance in the present method.

In summary, the present invention provides a method for forming zinc oxide and hydrogen. This method provides a zinc particulate formed by an aerosol process to promote the hydrolysis reaction of zinc vapor and water vapor. Due to the formation of nuclei, more reaction sites are provided, activation energy is reduced and the zinc oxide deposition is taken away by the carrier gas more easily. Furthermore, the formed zinc oxide can be recycled as the zinc particulate to promote hydrolysis reaction. In addition, hydrogen is formed with the zinc oxide simultaneously. The obtained hydrogen may be further used for other applications of hydrogen energy. In contrast to the conventional process, the present method provides an efficient use of energy and increases the yields of zinc oxide. Furthermore, nano-sized zinc oxides may be formed, which can be used in various fields.

While the preferred embodiments of the invention have been described above, it will be recognized and understood that various modifications can be made in the invention and the appended claims are intended to cover all such modifications which may fall within the spirit and scope of the invention.

What is claimed is:

1. A method for forming zinc oxide, comprising:
   introducing zinc vapor and water vapor to a reactor; and
   providing a zinc-based particulates to enter into the reactor to promote reaction of the zinc vapor and the water vapor to form zinc oxide and hydrogen, wherein the reactor temperature is between about 600° C. and about 910° C.

2. The method of claim 1, wherein the zinc-based particulate comprises zinc, zinc oxide, zinc hydroxide or combinations thereof.

3. The method of claim 1, wherein the zinc-based particulate is present in a form of a solid particle or a liquid droplet.

4. The method of claim 3, wherein the zinc-based particulate is formed by an aerosol process.

5. The method of claim 4, wherein the aerosol process comprises:
   vaporizing the zinc or a zinc precursor represented by ZnM to form a saturated vapor, wherein M is oxygen, hydroxyl, alkoxyl or combinations thereof; and
   mixing the saturated vapor with a cold dilute gas to form the zinc-based particulate by a vaporizing-condensing mechanism.

6. The method of claim 5, wherein the cold dilute gas comprises nitrogen, argon, inert gases non-reactive to zinc or zinc oxide, or combinations thereof.

7. The method of claim 5, wherein the cold dilute gas has a temperature between about 10° C. and about 400° C.

8. The method of claim 5, wherein a flow rate ratio of the saturated vapor and the cold dilute gas is between about 0.005:1 and about 0.15:1.

9. The method of claim 5, wherein a temperature of the saturated vapor is between about 400° C. and about 1000° C.

10. The method of claim 1, wherein a temperature of the zinc vapor is between about 400° C. and about 1000° C.

11. The method of claim 1, wherein the zinc-based particulate has a diameter between about 3 nm and about 1 μm.

12. The method of claim 1, wherein a flow rate ratio of the zinc vapor to the water vapor is between about 1:1 and about 1:100.

13. The method of claim 1, wherein a molar ratio of the zinc vapor to the zinc-based particulate is between about 10,000:1 and about 1,000,000,000:1.

14. The method of claim 1, wherein of zinc oxide has a particle size between about 3 nm and about 10 μm.

15. The method of claim 1, further comprising recycling the zinc oxide thus formed as the zinc-based particulate to promote the reaction.

16. The method of claim 1, wherein the zinc vapor, the water vapor and the zinc-based particulate are transported by a carrier gas.

17. The method of claim 1, wherein the carrier gas comprises nitrogen, argon, inert gases non-reactive to zinc or zinc oxide, or combinations thereof.

* * * * *